(12) United States Patent
Mereddy (10) Patent No.: US 11,646,963 B2
(45) Date of Patent: *May 9, 2023

(54) MULTI-DOMAIN QUALITY OF SERVICE SOFTWARE-DEFINED NETWORKING CONTROLLER

(71) Applicant: Charter Communications Operating, LLC, St. Louis, MO (US)

(72) Inventor: Sandeep Reddy Mereddy, Aurora, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 17/520,971

(22) Filed: Nov. 8, 2021

(65) Prior Publication Data

US 2022/0060409 A1 Feb. 24, 2022

Related U.S. Application Data

(63) Continuation of application No. 16/744,612, filed on Jan. 16, 2020, now Pat. No. 11,201,819.

(51) Int. Cl.
*H04L 47/2408* (2022.01)
*H04L 45/02* (2022.01)
(Continued)

(52) U.S. Cl.
CPC .......... *H04L 45/38* (2013.01); *H04L 41/0853* (2013.01); *H04L 45/02* (2013.01);
(Continued)

(58) Field of Classification Search
CPC ......... H04L 45/38; H04L 45/02; H04L 45/04; H04L 45/64; H04L 47/2408;
(Continued)

(56) References Cited

U.S. PATENT DOCUMENTS 8,976,813 B2 3/2015 Bekiares et al.
9,197,569 B2 11/2015 Li
(Continued)

FOREIGN PATENT DOCUMENTS

CN 102195892 B 7/2014

*Primary Examiner* — Mohamed A Kamara
(74) *Attorney, Agent, or Firm* — Young Basile Hanlon & MacFarlane, P.C.

(57) ABSTRACT

Methods and systems for a multiple domain quality of service software-defined networking (SDN) controller are described. A method includes discovering network devices in a network, collecting traffic flow data from each of the discovered network devices, collecting configuration and operational data from each of the discovered network devices, categorizing the traffic flow data into traffic flow types for presentation as a first level view, determining source and destination pairs for each traffic flow in each of the traffic flow types for presentation as a second level view, generating network device micro-topologies for each of the source and destination pairs for presentation as a third level view, mapping at least one network device characteristic for each network device in each network device micro-topology for presentation as a fourth level view, and performing corrective measures on network devices identified for issues from the presented network device characteristics.

20 Claims, 6 Drawing Sheets

(51) Int. Cl.
  *H04L 45/64* (2022.01)
  *H04L 41/0853* (2022.01)
  *H04L 45/00* (2022.01)
  *H04L 69/22* (2022.01)
  *H04L 47/2441* (2022.01)

(52) U.S. Cl.
  CPC .............. *H04L 45/04* (2013.01); *H04L 45/64* (2013.01); *H04L 47/2408* (2013.01); *H04L 47/2441* (2013.01); *H04L 69/22* (2013.01)

(58) Field of Classification Search
  CPC . H04L 47/2441; H04L 41/0895; H04L 41/40; H04L 43/20; H04L 45/302; H04L 41/22; H04L 41/0853; H04L 41/5025; H04L 43/026; H04L 43/062; H04L 41/12
  See application file for complete search history.

(56) References Cited

U.S. PATENT DOCUMENTS

| | | | |
|---|---|---|---|
| 9,729,426 B2 | 8/2017 | Uppalli et al. | |
| 11,201,819 B2 * | 12/2021 | Mereddy | H04L 41/5025 |
| 2008/0056153 A1 | 3/2008 | Liu | |
| 2015/0172208 A1* | 6/2015 | DeCusatis | H04L 41/0803 |
| | | | 709/226 |
| 2016/0119255 A1* | 4/2016 | Luo | H04L 41/0663 |
| | | | 370/218 |
| 2018/0317121 A1 | 11/2018 | Liao et al. | |
| 2018/0351820 A1* | 12/2018 | Nagarajan | H04L 41/0803 |
| 2020/0092184 A1 | 3/2020 | Park et al. | |
| 2020/0274781 A1* | 8/2020 | Kushwaha | H04L 43/062 |

\* cited by examiner

3000: VERSION | TRAFFIC CLASS DSCP | FLOW LABEL

FIG. 4

4000: VERSION | HEADER | TYPE OF SERVICE DSCP | TOTAL LENGTH

MULTI-DOMAIN QUALITY OF SERVICE SOFTWARE-DEFINED NETWORKING CONTROLLER

CROSS REFERENCE TO RELATED APPLICATION

This application is a continuation of U.S. application Ser. No. 16/744,612 filed Jan. 16, 2020, of which is incorporated herein by reference.

TECHNICAL FIELD

This disclosure relates to networks. More specifically, this disclosure relates to monitoring and managing quality of service network traffic flow across multiple domains.

BACKGROUND

Networks are a collection of nodes connected via links, where the nodes use circuit switching, message switching, packet switching, and other technologies to pass a signal through the correct links and nodes from a source node to a destination node. The network uses a combination of unique node addresses, routing tables, and other network information to so that messages or connections can be correctly routed to the destination node.

Quality of service (QoS) metrics measure the overall performance of a service, such as voice, streaming, Web access, computer network or a cloud computing service, and other services generally used by customers, clients, or users of a network (collectively "customers"). The QoS can be an inherent obligation of service providers or a contractual obligation via service level agreements (SLAs), which are between service providers and customers to provide an agreed upon QoS for different types of services.

QoS issues can occur anywhere in the network. However, there are no tools available which provide visibility of QoS traffic flow on devices such as routers and switches which are used to implement multi-domain networks. Troubleshooting QoS issues on these individual devices on the transit path requires checking the traffic flow on that particular device. Checking the traffic flow on a particular device requires sending the traffic flow data to a remote collector and analyzing the traffic flow data using Wireshark or tapping the traffic flow on particular devices to see the QoS precedence values. Both of these techniques are time consuming and delay resolving the QoS in a timely and efficient manner.

SUMMARY

Disclosed herein are methods and systems for a multiple domain quality of service (QoS) software-defined networking (SDN) controller. A method for multiple domain software-defined networking (SDN) controller processing includes discovering, by a SDN controller, network devices in a network, collecting, by the SDN controller, traffic flow data from each of the discovered network devices, collecting, by the SDN controller, configuration and operational data from each of the discovered network devices, categorizing, by the SDN controller, the traffic flow data into traffic flow types for presentation as a first level view, determining, by the SDN controller, source and destination pairs for each traffic flow in each of the traffic flow types for presentation as a second level view, generating, by the SDN controller, network device micro-topologies for each of the source and destination pairs for presentation as a third level view, mapping, by the SDN controller, a at least one network device characteristic for each network device in each network device micro-topology for presentation as a fourth level view, where each of the first level view, the second level view, the third level view and the fourth level view are linked, and performing, by the SDN controller, corrective measures on network devices identified for issues from the presented network device characteristics.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Described herein are methods, devices and systems for multiple domain quality of service (QoS) software-defined networking (SDN) controller. A multiple domain QoS SDN controller collects traffic flow information from a network across multiple domains which includes data center networks, backbone or infrastructure networks, and market-side or customer facing networks. In an implementation, each of the multiple domains may be owned or operated by different vendors. The multiple domain QoS SDN controller also collects operational and configuration data from network devices such as routers, switches, and like devices. The multiple domain QoS SDN controller generates micro-topologies from the collected information and data and maps QoS information onto the micro-topologies to visualize QoS changes.

In an implementation, the multiple domain QoS SDN controller provides a multi-level visualization of the traffic flow and QoS in a network. A first view level presents the different traffic flow types including IPv4 and IPv6. A second view level presents source and destination pairs for each flow in the different traffic flow types. A third view level presents the network devices in each source and destination pair for each flow in the different traffic flow types. A fourth view level presents the QoS for each network device in each source and destination pair for each flow in the different traffic flow types. In an implementation, an inbound QoS and an outbound QoS are presented for each network device. Each view is interlinked to easily switch between the view and understand the underlying view relationships.

In an implementation, the multiple domain QoS SDN controller includes multiple components which collectively generate a multi-tiered representation of network flow and a designated flow characteristic. In an implementation, the flow characteristic is QoS. The components include a network flow collector, network device collector, and a mapping module. In an implementation, the network flow collector includes a network device discovery module to find every IP network device connected to the network and an IP network traffic collector to collect traffic flow statistics and characteristics from each discovered network device. In an implementation, the network device collector collects network device operational and configuration data such as router instances, routes, routing tables, routing protocols and route filters. In an implementation, the mapping module uses the collected data to provide differentiated services code point (DSCP) values for each network device in a generated micro-topology. In an implementation, the mapping module uses the collected data to provide inbound and outbound DSCP values for each network device in the generated micro-topology.

In an implementation, different QoS metrics can be searched to determine, for example, percentage of traffic flow using a specific QoS metric. In an implementation, a domain can be searched to see which QoS metric is dominant. In an implementation, QoS metrics may be overlaid with vendors to see QoS usage.

Figure 1:
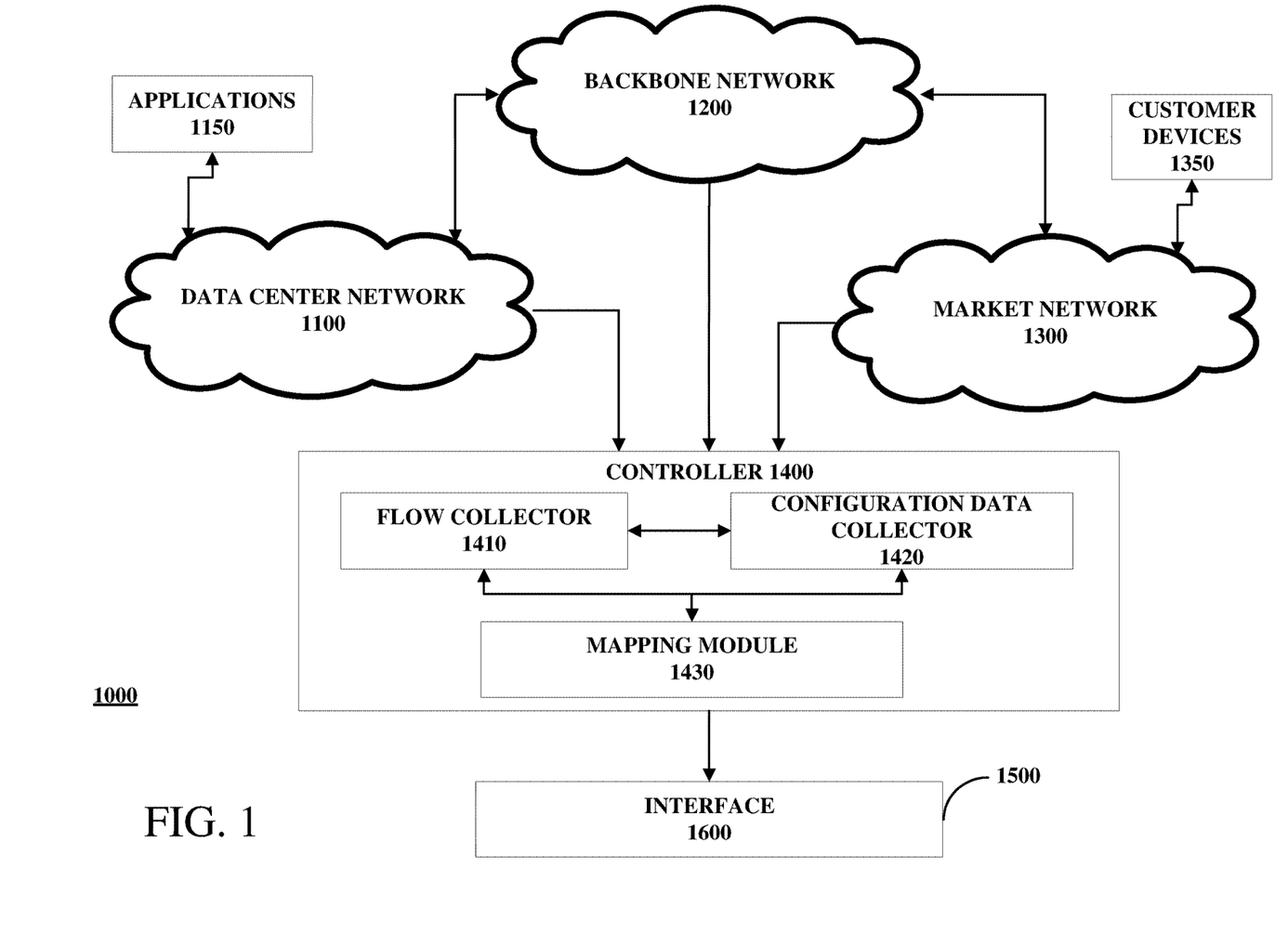
FIG. 1 is a diagram of an example architecture with a multiple domain quality of service (QoS) software-defined networking (SDN) controller and system in accordance with embodiments of this disclosure.

FIG. 1 is a diagram of an example architecture 1000 with a multiple domain quality of service (QoS) software-defined networking (SDN) controller and system in accordance with embodiments of this disclosure. The architecture 1000 includes multiple domains with associated networks. In an implementation, multiple different vendors may own and/or operate each network. In an implementation, the architecture 1000 may include a data center network 1100 which is connected to or in communication with (collectively "connected to") applications 1150 and a backbone network 1200. The backbone network 1200 is connected to the market or customer facing network 1300 (collectively "market"), which in turn is connected to customer devices, client devices, and user devices 1350 (collectively "customer devices"). In an implementation, the applications 1150 may be services, content, software, and the like (collectively "services") which are executed in part on the data center network 1100 and used by or on the customer devices 1350 via the data center network 1100, the backbone network 1200, and the market network 1300.

The architecture 1000 further includes an SDN controller 1400 which is connected to each of the data center network 1100, the backbone network 1200, and the market network 1300. The SDN controller 1400 includes a flow collector 1410, a configuration data collector 1420, and a mapping module 1430, each of which may be interconnected. The SDN controller 1400 is connected to a display 1500 for presenting a graphical user interface (GUI) 1600 which allows for interaction with a multi-level view output of the SDN controller 1400 as shown, for example, in FIG. 3.

The connections between the data center network 1100, the backbone network 1200, the market network 1300, the SDN controller 1400, the display 1500, and the customer devices may be wired, wireless or a combination thereof. The architecture 1000 and elements therein are illustrative and may include additional, fewer or different devices, entities, and the like which may be similarly or differently architected without departing from the scope of the specification and claims herein. Moreover, the illustrated elements, devices, and the like may perform other functions without departing from the scope of the specification and claims herein.

The customer devices 1350 are devices in the customer, client, user, or subscriber location from where services may be requested from the applications 1150 or from other customer devices 1350 via the data center network 1100, the backbone network 1200, and the market network 1300. The customer devices 1350 may be, but are not limited to, customer premises equipment, end user devices, set-top boxes, personal computers (PCs), cellular telephones, Internet Protocol (IP) devices, computers, desktop computers, laptops, mobile devices, handheld computers, PDAs, personal media devices, smartphones, notebooks, notepads, phablets, servers, and the like.

The SDN controller 1400 is a server(s), computing device(s), processor(s), computing platform which includes server(s), computing device(s), and/or processor(s), and like device which discovers network devices and collects traffic flow data via the flow collector 1410 and collects network device data including routing tables via the configuration data collector 1420. The SDN controller 1400 generates micro-topologies and overlays network characteristic data such as QoS metrics on each micro-topology by mapping the collected traffic flow data with the network device data.

The data center network 1100, the backbone network 1200, and the market network 1300 may be or may include, but is not limited to, the Internet, an intranet, a local area network (LAN), a wide area network (WAN), a public network, a private network, a cellular network, a WiFi-based network, a telephone network, a landline network, public switched telephone network (PSTN), a wireless network, a wired network, a private branch exchange (PBX), an Integrated Services Digital Network (ISDN), a IP Multimedia Services (IMS) network, a Voice over Internet Protocol (VoIP) network, and the like including any combinations thereof. The data center network 1100, the backbone network 1200, and the market network 1300 may include networking devices such as routers, switches, and like devices.

Figure 2:
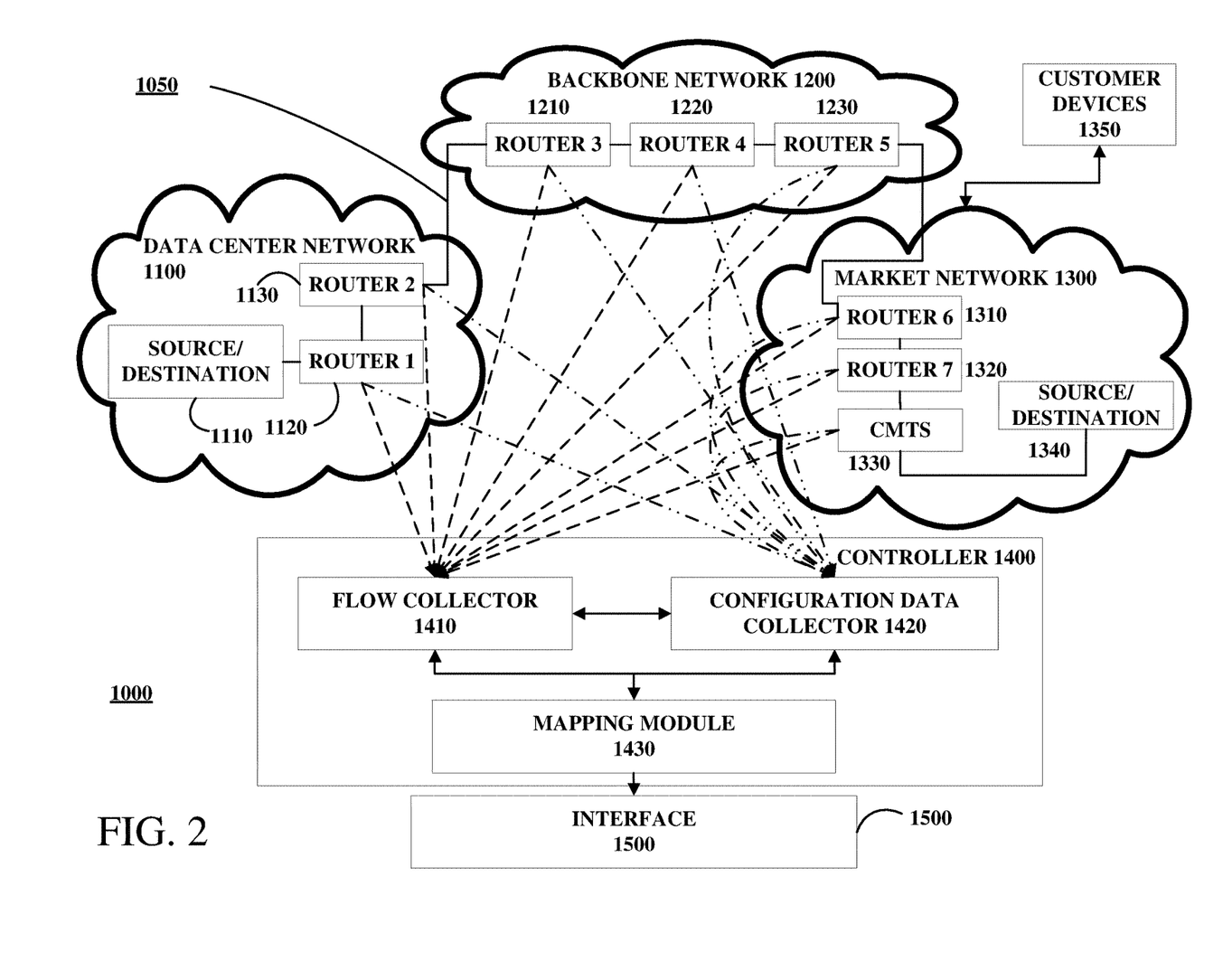
FIG. 2 is a detailed diagram of the system of FIG. 1 in accordance with embodiments of this disclosure.

FIG. 2 is a detailed diagram of the architecture 1000 of FIG. 1 in accordance with embodiments of this disclosure. In an illustrative example, the architecture 1000 includes a number of network devices which are logically situated in one of the three network domains described herein. In an implementation, the number of network devices in the architecture 1000 is illustrative and can include any number of network devices.

In an illustrative example, the data center network 1100 may include a source or destination node or terminal 1110 which is connected to a network device, including but not limited to, a router 1 1120, which in turn is connected to a router 2 1130. In an implementation, the number of network devices in data center network 1100 is illustrative and can include any number of network devices. The backbone network 1200 may include network devices, including but not limited to, a router 3 1210, a router 4 1220, and a router 5 1230. In an implementation, the number of network devices in backbone network 1200 is illustrative and can include any number of network devices. The market network 1300 may include network devices, including but not limited to, a router 6 1310 and a router 7 1320. The router 7 1320 is connected to a cable modem termination system (CMTS) 1330, which is used to provide services, such as cable, Internet, telephony, television, and the like to customers via customer devices 1350. In an illustrative example, the router 1 1120, the router 2 1130, the router 3 1210, the router 4 1220, the router 5 1230, the router 6 1310, and the router 7 1320 may constitute a multiple domain network 1050.

Figure 3:
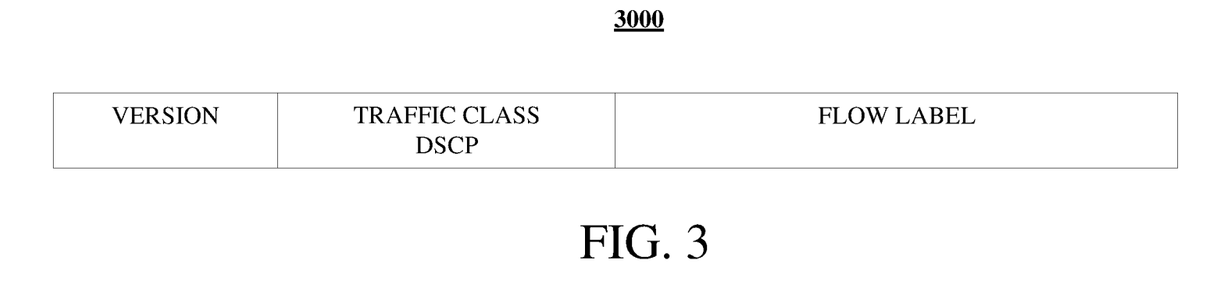
FIG. 3 is an example IPv6 message format.

FIG. 3 shows an example IPv6 message format 3000. The IPv6 message format 3000 includes a version field 3100, a traffic class field 3200 including a DSCP value field 3210, and a flow label field 3300. A SDN controller can use the fields to categorize the traffic flow and map the traffic flow with the network devices as described herein.

Figure 4:
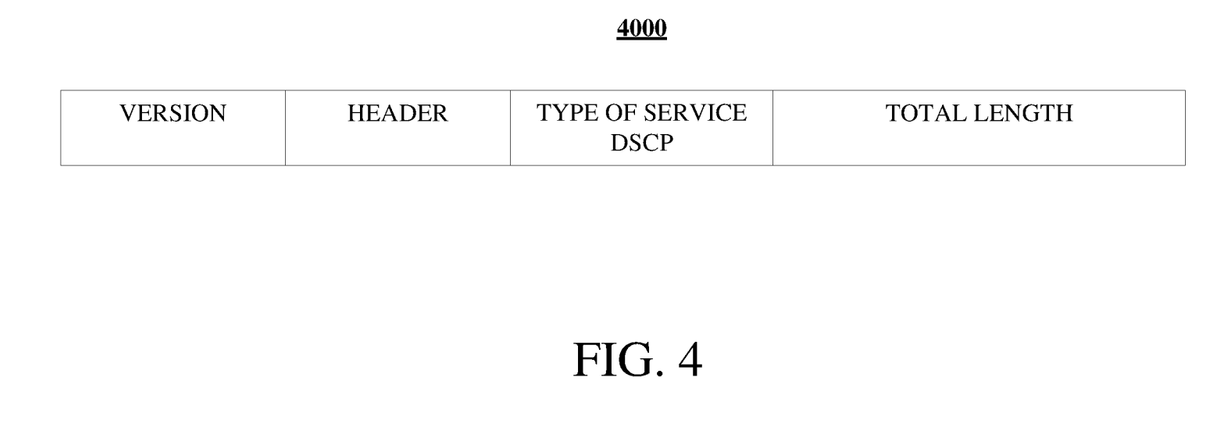
FIG. 4 is an example IPv4 message format.

FIG. 4 shows an example IPv4 message format 4000. The IPv4 message format 4000 includes a version field 4100, a header field 4200, a type of service traffic class field 4200 including a DSCP value field 4210, and a total length field 4300. A SDN controller can use the fields to categorize the traffic flow and map the traffic flow with the network devices as described herein.

Figure 5:
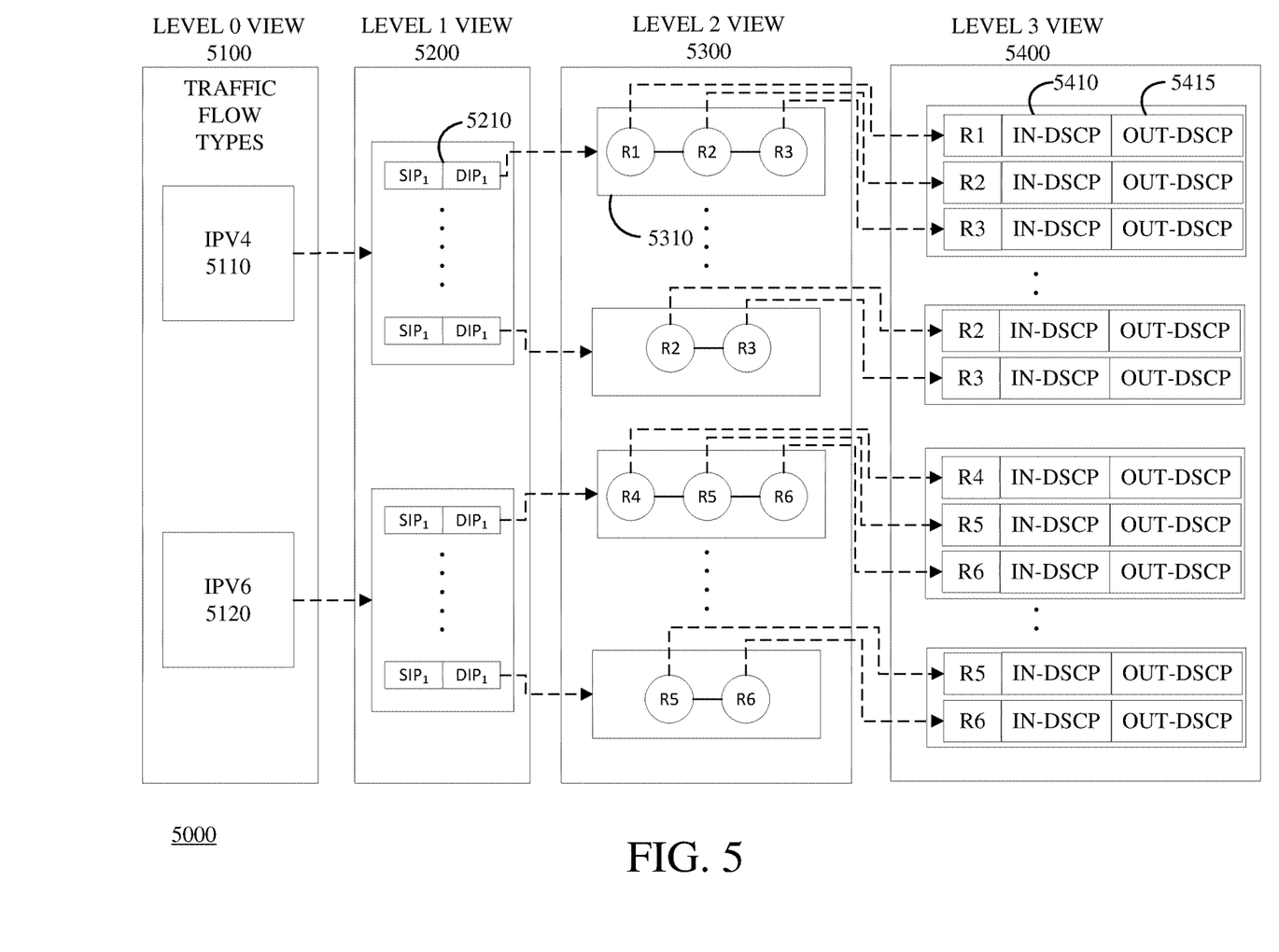
FIG. 5 is a block and flow diagram of an example of multiple level SDN controller views in accordance with embodiments of this disclosure.

FIG. 5 is a block and flow diagram of an example of multiple level SDN controller views 5000 in accordance with embodiments of this disclosure. The multiple level SDN controller views 5000 include a level 0 view 5100, a level 1 view 5200, a level 2 view 5300, and a level 3 view 5400. Each of the views 5100-5400 are relationally linked. Each view 5100-5400 presents a different aspect of traffic flow on a network. The level 0 view 5100 presents each of the different traffic flow types existing on a network. For example, the level 0 view 5100 can include a IPv4 flow type 5110 and a IPv6 flow type 5120 based on the traffic flow data collected as described herein. The level 1 view 5200 can include source Internet Protocol address (IP) (SIP) and destination IP (DIP) address pairs 5210 for each traffic flow in each traffic flow type based on the traffic flow data collected as described herein. The level 2 view 5300 shows micro-topologies 5310 for each of the SIP and DIP pairs based on the traffic flow data collected and configuration/operational data collected from each of the discovered network devices. For example, a SDN controller reviews a routing table of each discovered network device, determines how the SIP and DIP are connected, and generates a micro-topology 5310 of the network devices for each traffic flow or SIP and DIP pair. The level 3 view 5400 shows a network device characteristic 5410 for each of the network devices in each of the micro-topologies 5310 such that the flow of network device characteristics 5410 and 5415 can be seen as a signal or message sent across the network from the SIP to the DIP. For example, in FIG. 5 the network device characteristic 5410 and 5415 are QoS metrics. In an implementation, the QoS metric is a DSCP value which is present in IPv6 and IPv4 traffic flow types as shown in FIGS. 3 and 4. In an implementation, the network device characteristics 5410 and 5415 are inbound and outbound network device characteristics for each network device in a designated topology 5310. For example, IN-DSCP and OUT-DSCP. In an implementation, the network device characteristics 5410 and 5415 are different network device characteristics. The number of network device characteristics presented is variable and FIG. 5 is an illustrative example.

Operationally, referring to FIGS. 1-5, the flow collector 1410 performs a discover process to find every network device or IP network device connected to the multiple domain network 1050. In an implementation, the discover process can discover the router 1 1120, the router 2 1130, the router 3 1210, the router 4 1220, the router 5 1230, the router 6 1310, the router 7 1320, and the CMTS 1330. For example, a Simple Network Management Protocol (SNMP) discover process can be used. The flow collector 1410 collects traffic flow data from all discovered network devices. For example, the traffic flow data can be obtained using NetFlow or other like applications. The traffic flow data includes different traffic flow types such as IPv6 and IPv4, for example, as shown in FIGS. 3 and 4. Each of the traffic flows are categorized based on header information and generates a level 0 view for traffic flow types as shown in FIG. 5. The traffic flow data is used to generate SIP and DIP pairs for each of the traffic flows in each traffic flow type and generate a level 1 view for each traffic flow.

The configuration data collector 1420 collects routing table in addition to other configuration and operational data from each discovered network device. The routing table data is used to generate a micro-topology for each SIP-DIP pair (a level 2 view). This shows which network devices are forwarding the signal or message and how they are connected.

The mapping module 1430 maps the network device characteristics from each of the flows to each of the network devices in each of the micro-topologies and generates a level 3 view. This shows network device characteristic flow as the signal or message travels from the SIP to the DIP.

Selection of different level views provides different levels of resolution or granularity when issues arise with traffic flow or when patterns of behavior are needed to proactively manage traffic flow. In an illustrative example, assume that a signal or message from a SIP to a DIP is associated with a high priority, Expedited Forwarding (EF), Critical level DSCP value. An alert on the interface 1600 can indicate an issue with this signal or message. In an implementation, the alert can be visual, audio based, or a combination thereof. If in reviewing the DSCP flow, a Best Effort, Routine level DSCP value is associated with a network device in the identified traffic flow, corrective measures can be taken via the SDN controller. For example, configuration data can be sent to the network device to reconfigure the network device. Alternatively, the traffic flow can be re-routed. Other corrections known to one of the skill in the art can be taken.

In an illustrative example, traffic flow in terms of a network device characteristics can be used to proactively configure certain network devices or re-route traffic flow to alleviate congestion and other potential issue. In an illustrative example, traffic flow in terms of a specific network device characteristic can be selected to see observe patterns based on time of day usage, day of week usage, and other time lines.

Figure 6:
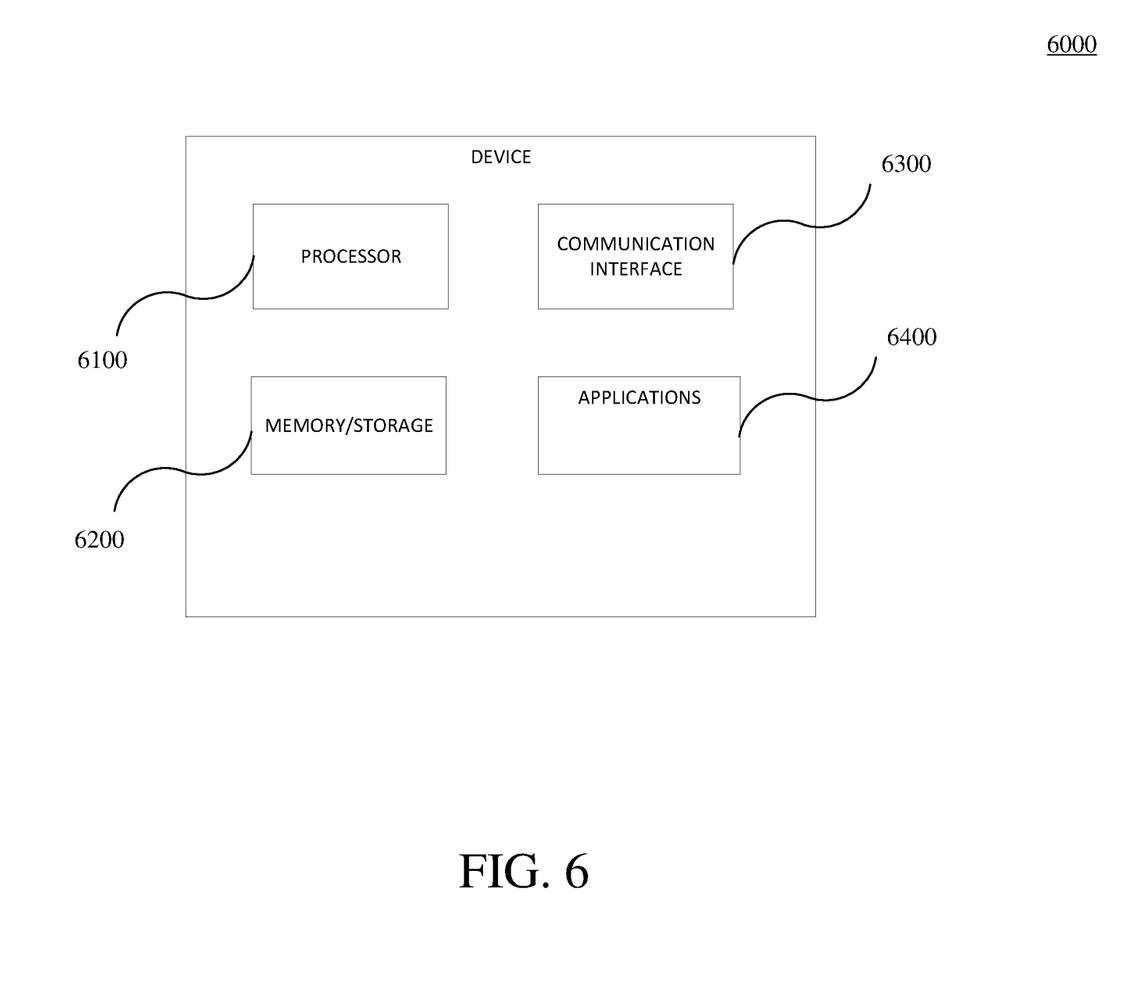
FIG. 6 is a block diagram of an example of a device in accordance with embodiments of this disclosure.

FIG. 6 is a block diagram of an example of a device 6000 in accordance with embodiments of this disclosure. The device 6000 may include, but is not limited to, a processor 6100, a memory/storage 6200, a communication interface 6300, and applications 6400. The device 6000 may include or implement, for example, the SDN controller 1400, the display 1500, the network devices, the router 1 1120, the router 2 1130, the router 3 1210, the router 4 1220, the router 5 1230, the router 6 1310, the router 7 1320, the CMTS 1330, and the customer devices 1350. The service integrated DNS server techniques or methods described herein may be stored in the memory/storage 3200 and executed by the processor 3100 in cooperation with the memory/storage 3200, the communications interface 3300, and applications 3400, as appropriate. The device 3000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 7:
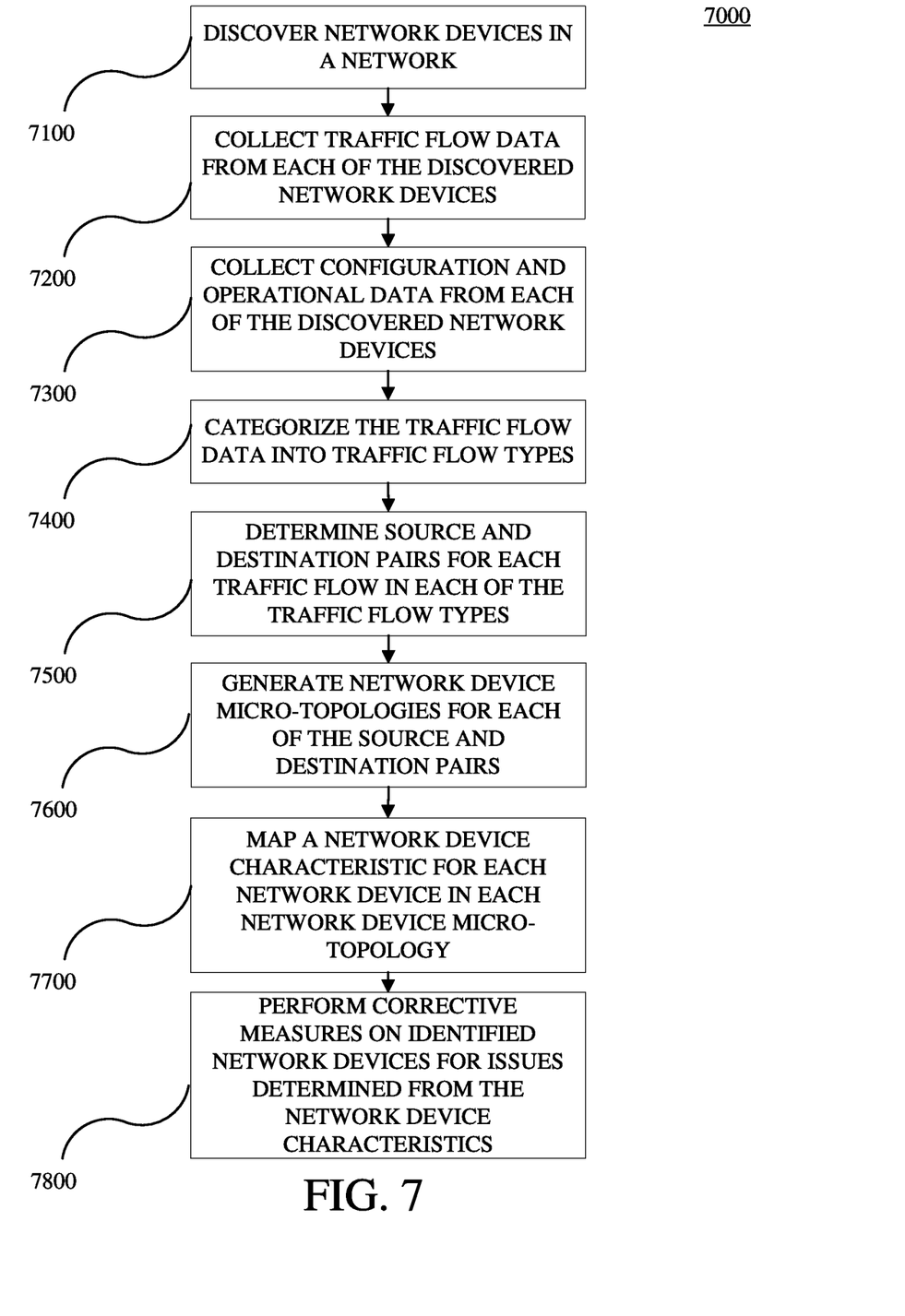
FIG. 7 is a flowchart of an example method for a multiple domain QoS SDN controller in accordance with embodiments of this disclosure.

FIG. 7 is a flowchart of an example method 7000 for multiple domain quality of service (QoS) software-defined networking (SDN) controller and system in accordance with embodiments of this disclosure. The method 7000 includes: discovering 7100 network devices in a network; collecting 7200 traffic flow data from each of the discovered network devices; collecting 7300 configuration and operational data from each of the discovered network devices; categorizing 7400 the traffic flow data into traffic flow types; determining 7500 source and destination pairs for each traffic flow in each of the traffic flow types; generating 7600 network device micro-topologies for each of the source and destination pairs; mapping 7700 a network device characteristic for each network device in each network device micro-topology; and performing 7800 corrective measures on identified network devices for issues determined from the network device characteristics. For example, the method or technique 7000 may be implemented, as applicable and appropriate, by the SDN controller 1400 of FIG. 1, display 1500 of FIG. 1, the router 1 1120 of FIG. 2, the router 2 1130 of FIG. 2, the router 3 1210 of FIG. 2, the router 4 1220 of FIG. 2, the router 5 1230 of FIG. 2, the router 6 1310 of FIG. 2, the router 7 1320 of FIG. 2, the CMTS 1330 of FIG. 2, and the customer devices 1350 of FIG. 1, the data center network 1100 of FIG. 1, the backbone network 1200 of FIG. 1, and the market network 1300 of FIG. 1.

The method 7000 includes discovering 7100 network devices in a network. For a given network, a discovery process is performed to determine each network device in the network. For example, the network device can be routers, switches, and other like network devices.

The method 7000 includes collecting 7200 traffic flow data from each of the discovered network devices. For each discovered network device, traffic flow data is collected.

The method 7000 includes collecting 7300 configuration and operational data from each of the discovered network devices. For each discovered network device, configuration and operational data is collected including for example routing tables and other routing data.

The method 7000 includes categorizing 7400 the traffic flow data to traffic flow types. The collected traffic flow data is categorized into traffic flow types using header information in each of the collected traffic flows. This information is presented as a level 0 view.

The method 7000 includes determining 7500 source and destination pairs for each traffic flow in each of the traffic flow types. The collected traffic flow data includes source IP addresses, destination IP addresses, and other data. SIP and DIP pairs are generated for each traffic flow and presented as a level 1 view.

The method 7000 includes generating 7600 network device micro-topologies for each of the source and destination pairs. The routing table data collected from each network device is used to generate a micro-topology for a source and destination pair. This is presented as a level 2 view.

The method 7000 includes mapping 7700 a network device characteristic for each network device in each network device micro-topology. The network device characteristic from the collected traffic flow data is mapped to each network device in a micro-topology. For example, the network device characteristic is a QoS metric. For example, the QoS metric is a DSCP value. This is presented as a level 3 view. Each of the level views are linked to see different view granularity. In an implementation, different colors can be used for different levels of a network device characteristic.

The method 7000 includes performing 7800 corrective measures on identified network devices for issues determined from the network device characteristics. Alerts can be given if issues arise with traffic flow on the network. The different views may be reviewed to determine and identify problem network devices. In an implementation, the SDN controller can send corrective configuration data to the network device. In an implementation, the SDN controller can re-route traffic flow around the identified network devices. In an implementation, the SDN controller can re-route traffic flow around the identified network devices while also sending corrective configuration data to the network device.

In general, a method for multiple domain software-defined networking (SDN) controller processing includes discovering, by a SDN controller, network devices in a network, collecting, by the SDN controller, traffic flow data from each of the discovered network devices, collecting, by the SDN controller, configuration and operational data from each of the discovered network devices, categorizing, by the SDN controller, the traffic flow data into traffic flow types for presentation as a first level view, determining, by the SDN controller, source and destination pairs for each traffic flow in each of the traffic flow types for presentation as a second level view, generating, by the SDN controller, network device micro-topologies for each of the source and destination pairs for presentation as a third level view, mapping, by the SDN controller, at least one network device characteristic for each network device in each network device micro-topology for presentation as a fourth level view, wherein each of the first level view, the second level view, the third level view and the fourth level view are linked, and performing, by the SDN controller, corrective measures on network devices identified for issues from the presented network device characteristics. In an implementation, the method further includes determining, by the SDN controller, the traffic flow types from header information in each collected traffic flow. In an implementation, the method further includes determining, by the SDN controller, the source and destination pairs from source Internet Protocol (IP) address and destination IP address information available in the collected traffic flow data. In an implementation, the method further includes determining, by the SDN controller, the micro-topologies from routing table data in the collected configuration and operational data. In an implementation, the at least one network device characteristic is a quality of service metric. In an implementation, the quality of service metric is a differentiated services code point (DSCP) value. In an implementation, the at least one network device characteristic is an inbound DSCP value and an outbound DSCP value. In an implementation, the method further includes sending, by the SDN controller, corrective configuration data to identified network devices. In an implementation, the method further includes re-routing, by the SDN controller, traffic around the identified network devices.

In general, a method for multiple domain software-defined networking (SDN) controller processing includes collecting, by a traffic flow collector, traffic flow data for each router in a multiple domain network, collecting, by a configuration collector, routing data from each router, presenting, on a display, each traffic flow type represented in the traffic flow data, presenting, on the display, source and destination pairs for each traffic flow type from the traffic flow data, presenting, on the display, a router topology for each of the source and destination pairs from the routing data, presenting, on the display, a quality of service metric for each router in each router topology, the quality of service metric mapped from the traffic flow data, and taking, by a SDN controller, action against problematic routers. In an implementation, the method further includes determining, by the SDN controller, the traffic flow types from header information in the traffic flow data and determining, by the SDN controller, the source and destination pairs from source Internet Protocol (IP) address and destination IP address information available in the collected traffic flow data. In an implementation, the quality of service metric is a differentiated services code point (DSCP) value. In an implementation, each DSCP is associated with a different visual attribute. In an implementation, the method further includes sending, by the SDN controller, corrective routing data to the problematic routers. In an implementation, the method further includes re-allocating, by the SDN controller, traffic flow around the problematic routers.

In general, a multiple domain software-defined networking (SDN) controller includes a traffic flow collector configured to discover networking elements in a network and collect traffic flow data from each discovered networking element, a configuration collector configured to collect configuration and operational data from each discovered networking element, and a mapping module. The SDN controller is configured to generate a view for traffic flow types in the collected traffic flow data, generate a view for source and destinate pairs for each traffic flow from the traffic flow data, generate a view for micro-topologies based on network elements used for each source and destinate pair, generate a view for differentiated services code point (DSCP) values mapped for each network element by the mapping module, and resolve network issues related to network elements identified by the mapped DSCP values by at least sending corrective configuration data to the identified network elements. In an implementation, the network elements are in different network domains. In an implementation, the different network domains are owned or operated by different vendors. In an implementation, the traffic flow types are determined from header information in the collected traffic flow data, the source and destination pairs are determined from source Internet Protocol (IP) address and destination IP address information available in the collected traffic flow data, the micro-topologies are generated from routing table data in the collected configuration and operational data, and the DSCP values are mapped from collected traffic flow data. In an implementation, the SDN controller is further configured to re-route traffic around the identified network elements.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for multiple domain networking controller processing, the method comprising:
   generating, by the multiple domain networking controller, multi-level views for obtained traffic flow data, wherein one view shows an inbound value and an outbound value for at least one network device characteristic for each network device shown in a view of network device micro-topologies; and
   resolving, by the multiple domain networking controller, network issues related to network devices identified by the viewed inbound and outbound values by sending corrective configuration data to the identified network devices.

2. The method of claim 1, wherein one view shows traffic flow types in the traffic flow data.

3. The method of claim 2, wherein one view shows source and destination pairs for each traffic flow in the traffic flow types.

4. The method of claim 3, wherein the network device micro-topologies are for each of the source and destination pairs and at least one of the network device micro-topologies shows multiple network devices.

5. The method of claim 3, wherein the source and destination pairs are determined from source Internet Protocol (IP) address and destination IP address information available in the traffic flow data.

6. The method of claim 1, wherein the traffic flow data is collected from each network device discovered in a network.

7. The method of claim 1, the method further comprising:
   re-routing, by the multiple domain networking controller, traffic around the identified network devices.

8. A method for multiple domain network processing, the method comprising:
   presenting, on a display, an inbound quality of service metric and an outbound quality of service metric for each router in each router topology presented on the display as determined from obtained traffic flow data, the inbound quality of service metric and the outbound quality of metric mapped from the traffic flow data; and
   taking, by a controller, action against problematic routers as seen by presentation of the inbound quality of service metric and the outbound quality of metric for each router in each router topology.

9. The method of claim 8, the method further comprising:
   determining, by the controller, traffic flow types from header information in the traffic flow data; and
   presenting, on the display, each traffic flow type represented in the traffic flow data.

10. The method of claim 9, the method further comprising:
    determining, by the controller, source and destination pairs from source Internet Protocol (IP) address and destination IP address information available in the traffic flow data; and
    presenting, on the display, the source and destination pairs for each traffic flow type from the traffic flow data.

11. The method of claim 10, wherein router topologies are for each of the source and destination pairs.

12. The method of claim 8, wherein the inbound quality of service metric and the outbound quality of metric are differentiated services code point (DSCP) values.

13. The method of claim 8, wherein the traffic flow data is collected from each router discovered in a network.

14. The method of claim 8, wherein the action is sending corrective routing data to the problematic routers.

15. The method of claim 8, wherein the action is re-allocating traffic flow around the problematic routers.

16. A multiple domain software-defined networking (SDN) controller, comprising:
    a memory; and
    a processor configured to:
      generate a topology view of discovered network elements from source and destinate pairs in collected traffic flow data;
      generate a view for inbound and outbound differentiated services code point (DSCP) values mapped for each network element in the topology view, the DSCP values determined from the collected traffic flow data; and
      resolve network issues related to network elements identified by the viewed mapped inbound and outbound DSCP values by at least sending corrective configuration data to the identified network elements.

17. The multiple domain SDN controller of claim 16, wherein the network elements are in different network domains.

18. The multiple domain SDN controller of claim 17, wherein the different network domains are owned or operated by different vendors.

19. The multiple domain SDN controller of claim 18, wherein the source and destination pairs are determined from source Internet Protocol (IP) address and destination IP address information available in the collected traffic flow data and topologies are generated from routing table data in the collected configuration and operational data.

20. The multiple domain SDN controller of claim 19, wherein the processor is further configured to re-route traffic around the identified network elements.

* * * * *